US006263146B1

(12) United States Patent
Umeno et al.

(10) Patent No.: US 6,263,146 B1
(45) Date of Patent: Jul. 17, 2001

(54) APPARATUS FOR OPTICALLY GENERATING CHAOTIC RANDOM NUMBERS

(75) Inventors: Ken Umeno; Kenichi Kitayama, both of Tokyo (JP)

(73) Assignee: Communications Research Laboratory Ministry of Posts and Telecommunications, Tokyo (JP); a part interest ( * ) Notice: Subject to any disclaimer, the term of this patent is extended or adjusted under 35 U.S.C. 154(b) by 0 days.

(21) Appl. No.: 09/439,094

(22) Filed: Nov. 12, 1999

(30) Foreign Application Priority Data

Nov. 12, 1998 (JP) ........................................... 10-321943

(51) Int. Cl.[7] ........................................... G02B 6/00

(52) U.S. Cl. .............................. 385/147; 385/45; 385/46; 385/47; 385/48

(58) Field of Search .............................. 385/147, 39, 40, 385/41, 43, 44, 45, 46, 47, 48

(56) References Cited

U.S. PATENT DOCUMENTS 5,892,864 * 4/1999 Stoll et al. ......................... 385/40 X

FOREIGN PATENT DOCUMENTS 10-283344 10/1998 (JP) .

OTHER PUBLICATIONS

Nikkei Electronics, No. 719, pp. 107–113, "Wrestling with Switching Optical Technique at Terabit/Sec.", Jun. 29, 1998 (in Japanese).

K. Umeno, Physical Review E, vol. 55, No. 5, pp. 5280–5284, "Method of Constructing Exactly Solvable Chaos", May 1997.

S.M. Ulam, et al., American Mathematical Society, No. 403, p. 1120, "On Combination of Stochastic and Deterministic Processes", Nov. 1947.

R.L. Adler, et al., Proc. American Mathetical Society, No. 15, pp. 794–796, "Ergodic and Mixing Properties of Chebyshev Polynomials", 1964.

A. Tsuneda, et al., Electronic Dat Communication Society, vol. 18, No. 6, pp. 610–613, "Chaos Signal and Circuits", 1998.

P. Green, p. 124, "Fiber Optic Networks", 1993.

* cited by examiner

*Primary Examiner*—Phan T. H. Palmer
(74) *Attorney, Agent, or Firm*—Oblon, Spivak, McClelland, Maier & Neustadt, P.C.

(57) ABSTRACT

An apparatus for optically generating chaotic random numbers to obtain chaotic random numbers satisfying a chaotic dynamical system expressed by X(n+1)=F(X(n)) includes an optical signal splitting device for splitting light from a light source into a predetermined number of beams with identical optical power; an optical chaotic signal generating device comprising the same number of interferometers as the beams, each having a pair of optical paths for receiving the beams from the optical signal splitting device, splitting each of the beams, interfering the splitted beams and outputting optical chaotic signals; optical path length difference data memory device for memorizing data on a difference between the lengths of the pair of optical paths at portions thereof between splitting and interfering; optical output signal measuring device for measuring optical power of the optical chaotic signals output from the interferometers as chaotic random numbers; and an optical output signal memory device for memorizing measured optical power values of the optical chaotic signals expressed by a vector of a same number of dimensionally as the interferometers, whose elements are nonnegative real numbers.

5 Claims, 5 Drawing Sheets

APPARATUS FOR OPTICALLY GENERATING CHAOTIC RANDOM NUMBERS

BACKGROUND OF THE INVENTION

1. Field of the Invention

The present invention relates to an apparatus for optically generating chaotic random numbers satisfying a chaotic dynamical system that is expressed X(n+1)=F(X(n)), using an optical circuit.

2. Description of the Prior Art

Methods for producing random-number sequences are roughly divided into two. One of them uses a random number generator program memorized in a digital computer. The program corresponds to an existing pseudo-random-number generating program that includes (1) congruent random numbers produced by a modulus of congruence that is a random-number producing algorithm required in the Monte Carlo method applied to various fields, such as device modeling, finance derivative calculation and the like, (2) M sequences and (3) Gold codes that are random-number sequences produced by a shift register required in spread spectrum communication systems. The numbers, sequences and codes have heretofore been used widely.

The other method generates so-called physical random numbers from noise unavoidably inherent in a physically fabricated electronic circuit or electronic device. Since a micro-mechanism for generating such random number is unclear or complicated, this method lacks in repeatability of producing same random-number sequences under the same initial conditions and is improper for engineering random-number applications.

There is another method for generating so-called laser chaos as a chaotic random-number signal using an optical circuit with a time-lag feedback loop laser. However, since the equation expressing a signal is a non-linear, partial differential equation difficult to analyze, it is difficult to qualitatively predict the features of the random numbers. For this reason, an optical communication system on the order of terabit/sec having a random-noise generating portion has been neither put into practice nor commercialized. The incorporation of laser chaos into such a random-noise generating portion is in an experimental stage, and the integration of such random noise generating portions is difficult to realize due to the lack of the integration optic technology toward laser chaos.

The speed of transmitting a signal of random numbers in a digital computer or physical random numbers in an electronic circuit has its own limits due to the fact that electronic devices put into practical use are operated at a frequency of about 600 MHz. Therefore, the physical random-number generating method based on conventional electronic circuits or devices cannot be used for data transmission at a high-speed bit rate, such as terabit/sec for transmitting an animated cartoon etc. Further, the method for producing signals using optical laser chaos does not have good respectability because of the complexity of a system using the method and has a difficulty in generating random numbers easy to control, unlike the M sequences produced by a shift register, due to the difficulty of an engineering design requiring high precision.

In the conventional Monte Carlo computation, the calculation speed is determined by a stable operation speed of a semiconductor device. The pseudo-random-number generating program used in the Monte Carlo method clearly constitutes the performance of a digital computer and eventually the digital computer per se. For this reason, the high-speed calculation in the Monte Carlo method subjected to various applications has its own limits due to the electronic device operating limit (that is theoretically about 750 GHz, but practically about 600 MHz shown above, "Wrestling with Switching Optical Technique at Terabit/sec," Nikkei Electronics, p. 109, Jun. 29, 1998).

The present invention has been proposed to solve the problems of the limit of the random-number producing speed and the control thereof. The principal object of the present invention is to provide an apparatus for optically generating chaotic random numbers, that is high in repeatability of producing physical random numbers and easy to control, using the high-speed property of light and the deterministic properties and random numbers in a chaotic dynamical system.

Another object of the present invention is to provide an apparatus for optically generating chaotic random numbers, that enables data transmission at terabit/sec.

SUMMARY OF THE INVENTION

To attain the objects described above, the present invention provides an apparatus for optically generating chaotic random numbers to obtain chaotic random numbers satisfying a chaotic dynamical system expressed by X(n+1)=F(X(n)), comprising an optical signal splitting means for splitting light from a light source into a predetermined number of beams with identical optical power, an optical chaotic signal generating device comprising a same number of interferometers as the beam, each having a pair of optical paths for receiving the beams from the optical signal splitting means, splitting each of the beams, a interfering the splitted beams and outputting optical chaotic signals; an optical path length difference data memory device for memorizing data on a difference between lengths of the pair of optical paths at portions thereof between splitting and interfering; an optical output signal measuring device for measuring optical power of the optical chaotic signals output from the interferometers as chaotic random numbers; and an optical output signal memory device for memorizing measured optical power values of the optical chaotic signals expressed by a vector of a same number of dimensionality as the interferometers, with nonnegative real elements.

Since the optical chaotic signal generating device is constituted of an optical circuit provided with a plurality of parallel interferometers each having a pair of optical paths, such as a Mach-Zehnder interferometer, the high-speed property of light is used to make it possible to generate chaotic random at a higher bit rate of terabit/sec that has heretofore been unable to realize while a desirable random property that is an equidistribution property is maintained to the same extent as in the method for producing pseudo-random-numbers, such as M sequences produced by a conventional shift register and congruent random numbers produced by a modulus of congruence. In addition, since one-dimensional chaotic mappings not provided by apparatus for generating chaotic random numbers using laser chaos are used in the present invention, good repeatability of generating random numbers, necessary for spread spectrum communications and the Monte Carlo method, can be attained while the high speed of optical signals is maintained. This can make a statistical property of the random numbers explicit. Therefore, random number generation can easily be controlled.

Circuits each provided with a plurality of parallel interferometers having a pair of optical paths according to the present invention can be integrated, miniaturized and formed an a silicone substrate using a technology of producing a planar lightwave circuit.

The above and other objects, features and advantages of the present invention will become apparent from the description given hereinbelow with reference to the accompanying drawings.

DESCRIPTION OF THE PREFERRED EMBODIMENTS

Figure 1:
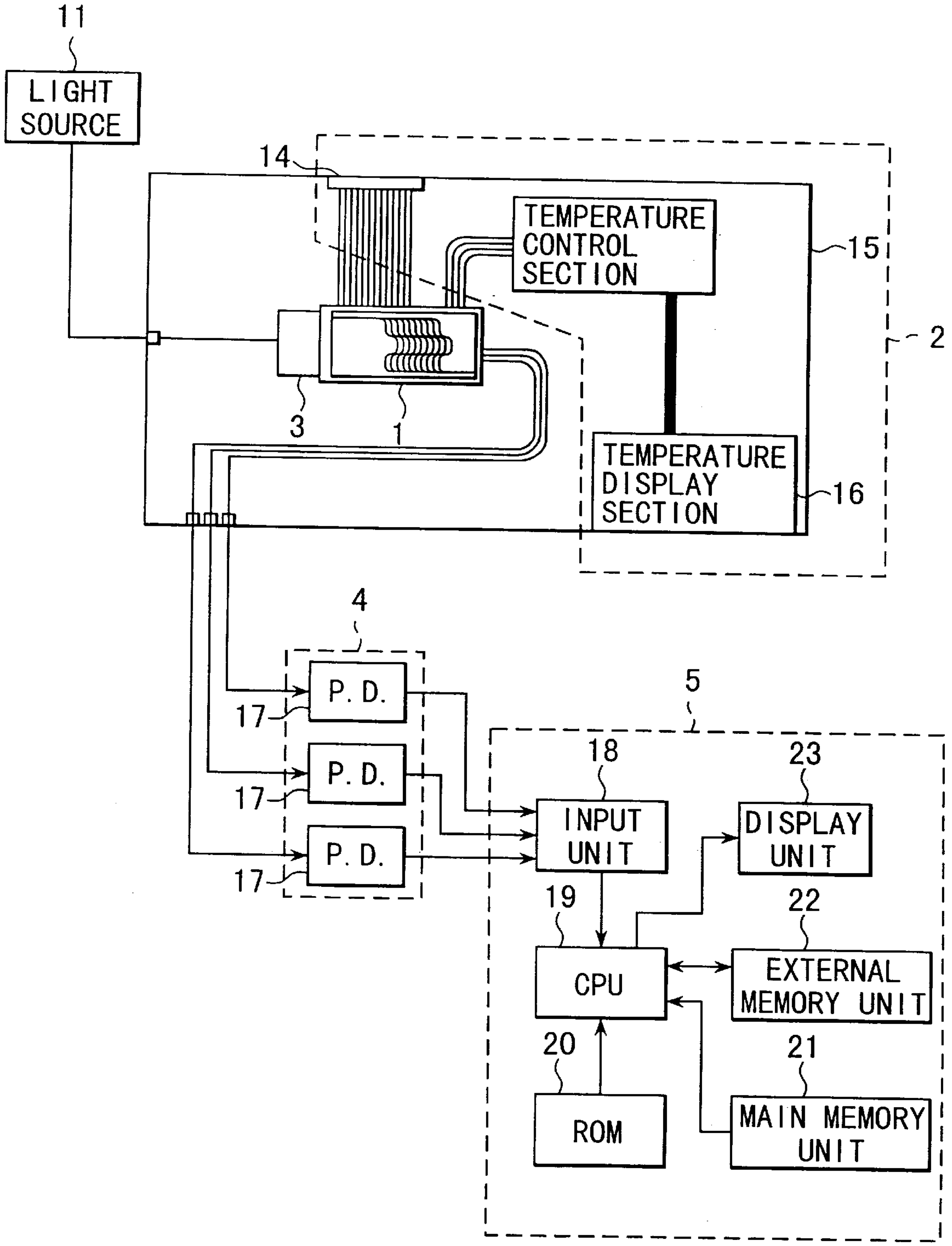
FIG. 1 is a schematic view showing the configuration of one example of an apparatus for optically generating chaotic random numbers according to the present invention.

The known facts relating to “solvable chaos” that constitutes the fundamental part of the present invention will be described and the present invention will then be described in comparison with a method of realizing chaos using an electronic circuit.

Though chaos is given by a deterministic equation X(j+1)=F(X(j)), it is a phenomenon sensitive to an initial value X(1). This can be universal found in a wide range of natural phenomena including the movements of heavenly bodies, atmospheric phenomena, changes in population or number of animals, and cerebral neuron responses to inputs. The fact that the phenomena universally found are chaos means not only that chaos has a deterministic property behind which rules exist in spite of the phenomena being considered to occur at random, but also that chaos is a phenomenon difficult to quantitatively analyze and substantially estimate over a long period of time in spite of the deterministic equation existing behind chaos, because the errors resulting from a fine difference in the initial value in approximately integration of a differential equation in a digital computer become great like a time exponential function when such phenomena are to be simulated using a computer, as was discovered by Lorentz in the 1960s.

Attempts have recently been made actually to apply chaos technologically. The fundamental idea of these attempts is to use chaos in place of a known apparatus for generating pseudo-random-numbers that can be calculated with a digital computer. However, since major chaotic dynamical systems are based on non-linear transformation, it is difficult to analytically obtain a solution of chaotic dynamical system. When the qualitative or quantitative features of the chaos are to be obtained, since it is forcibly required to use a digital computer to make calculations under large error conditions, the calculation results lack credibility. Therefore, interests have been taken in the presence of a class of analytically tractable chaotic maps from the standpoint of controlability that is important in engineering applications.

One of the inventors has recently reported that there are systematical classes of chaotic maps whose characteristics can be analytically obtained and that classes of non-linear maps can be fabricated by an addition theorem of an elliptic function (K. Umeno, Method of Construction Exactly Solvable Chaos, Phys. Rev. E (1997) Vol. 55, pp 5280–5284). A trigonometric function is included in an elliptic function. Therefore, since a logistic map (Equation 1) found to be chaotic equals the duplication formula of $\sin^2(a)$ $(\sin^2)2a)=4\sin^2(a)(1-\sin^2(a)))$, it has an analytic general solution $X(n)=\sin^2(2^{n-1}a)$ and falls in a class of solvable chaos maps.

$$X(j+1)=4X(j)(1-X(j)) \qquad [1]$$

The logistic map (Equation 1) has ergodicity (Equation 10 shown later), in which the spatial average equals the temporal average and there is a single invariant measure that is distribution for bringing the spatial average into an ensemble (S. M. Ulam and J. von Newmann, Bull. Math. Soc. 53 (1947) 1120 and the aforementioned report). It is known that the invariant measure can be expressed as Equation 9 shown later. The class of chaotic maps having ergodicity that is the ideal characteristic random numbers, having a general solution that can be expressed and explicitly showing its statistic law is called solvable chaos or exactly solvable chaos from the standpoint of the pronounced characteristics. This class is found to be greatly advantageous in application to the Monte Carlo method (“Statistic Simulation Method and Memory Medium with Its Program Recorded”, JP-P-A-HEI-10-283344) and in production of spreading sequences for the spread spectrum communication system.

The present invention physically realizes a chaotic map (also called the Chebyshev map, R. L. Adler and T. J Rivlin, Proc. Am. Math Soc. 15 (1964) 794) of the solvable chaos, that can be obtained from the multiplication formulae of a trigonometric function and is a substitute for the conventional technology using an electric device, that can generate random numbers at high speed using an optical circuit. The duplication formula corresponds to the logistic map (Equation 1) and the triplication formula to a cubic map (Equation 2). The preset invention can realize chaotic maps, called the Chebyshev map Fm corresponding to m-fold multiplication formulae, including the logistic and cubic maps.

$$X(j+1)=X(j)(3-4X(j)^2 \qquad (2)$$

Therefore, the present invention simulating the phenomenon of chaos using a physically fabricated apparatus falls in the category of an analogue computer used exclusively for random-number generation.

However, the conventional circuits for realizing chaos in the chaotic dynamical system represented by X(n+1)=F=(X(n)) are restricted to switch-capacitor (SC) circuits and switch-current (SI) circuits fabricated by the standard IC technology (Tsuneda, Eguchi and Inoue, “Chaos Signal and Chaos Circuit,” Electronic Data Communication Society, Vol. 18, No. 6, pp 610–613 (1998)).

These chaotic signal generating circuits can be fabricated with ease and integrated, but a computer incorporating such ICs does not have merits of chaos simulation speed and precision in comparison with high-performance digital computers used widely nowadays. Furthermore, like high-speed calculation has its own limits due to the electronic device operating limit (that is theoretically about 750 GHz, but practically about 600 MHz, “Wrestling with Switching Optical Technique at Terabit/sec,” Nikkei Electronics, p. 109).

In the present invention, therefore, an optical circuit comprising a plurality of Mach-Zehnder interferometers and using optical signal as input and output signals is used as an optical chaotic signal generating device to overcome the speed limits of a chaos circuit based on such an electronic device circuit.

An apparatus for optically generating chaotic random numbers according to the present invention will now be described in detail with reference to the accompanying drawings.

FIG. 1 is a schematic view showing the configuration of the apparatus of the present invention for obtaining chaotic random numbers satisfying a chaotic dynamical system expressed by X(n+1)=F(X(n)), that comprises an optical signal splitting device 3 for splitting light from a light source into a predetermined number of beams with identical optical power, an optical chaotic signal generating device 1 comprising the same number of interferometers 13 (FIG. 2) as the beams, each having a pair of optical paths for receiving the beams from the optical signal splitting device 3, splitting each of the beams, interfering the splitted beams and outputting optical chaotic signals; an optical path length difference data memory device 2 for memorizing data on a difference between the lengths of the pair of optical paths at portions thereof between splitting and interfering; an optical output signal measuring device 4 for measuring optical power of the optical chaotic signals output from the interferometers 13; and an optical output signal memory device 5 for memorizing measured optical power values of the optical chaotic signals expressed by a vector of the same number of dimensionality as the interferometers 13, with nonnegative real elements.

Figure 2:
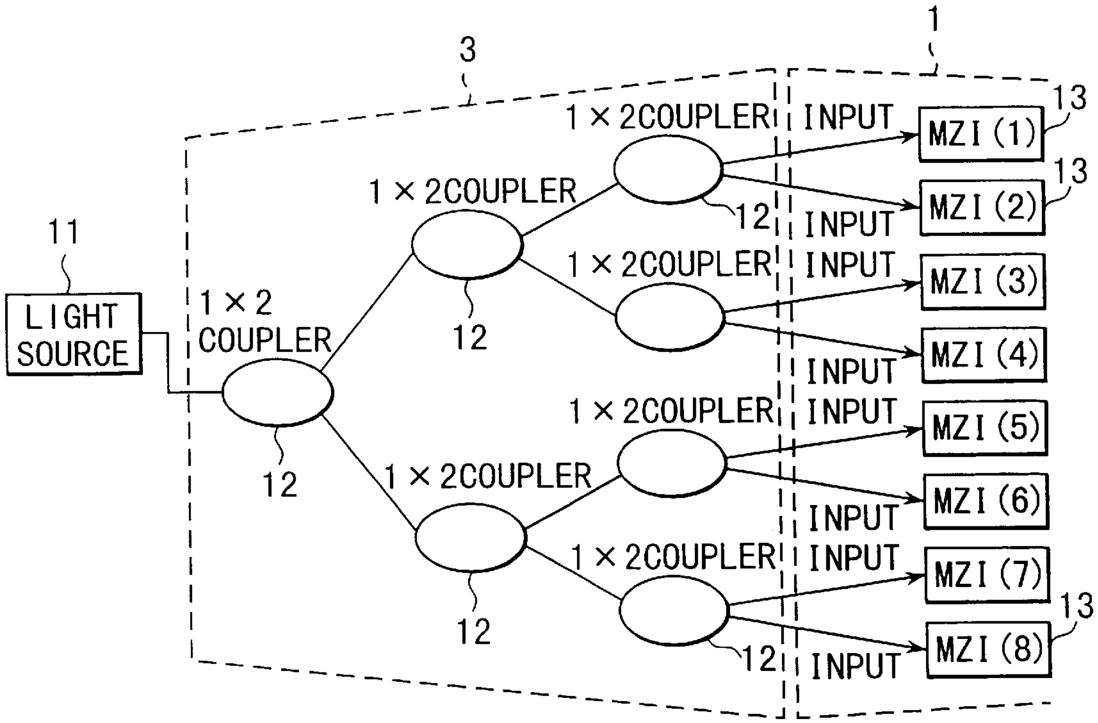
FIG. 2 is a schematic view showing an optical signal splitting device and an optical chaotic signal generating device, constituents of the apparatus shown in FIG. 1.
Figure 3:
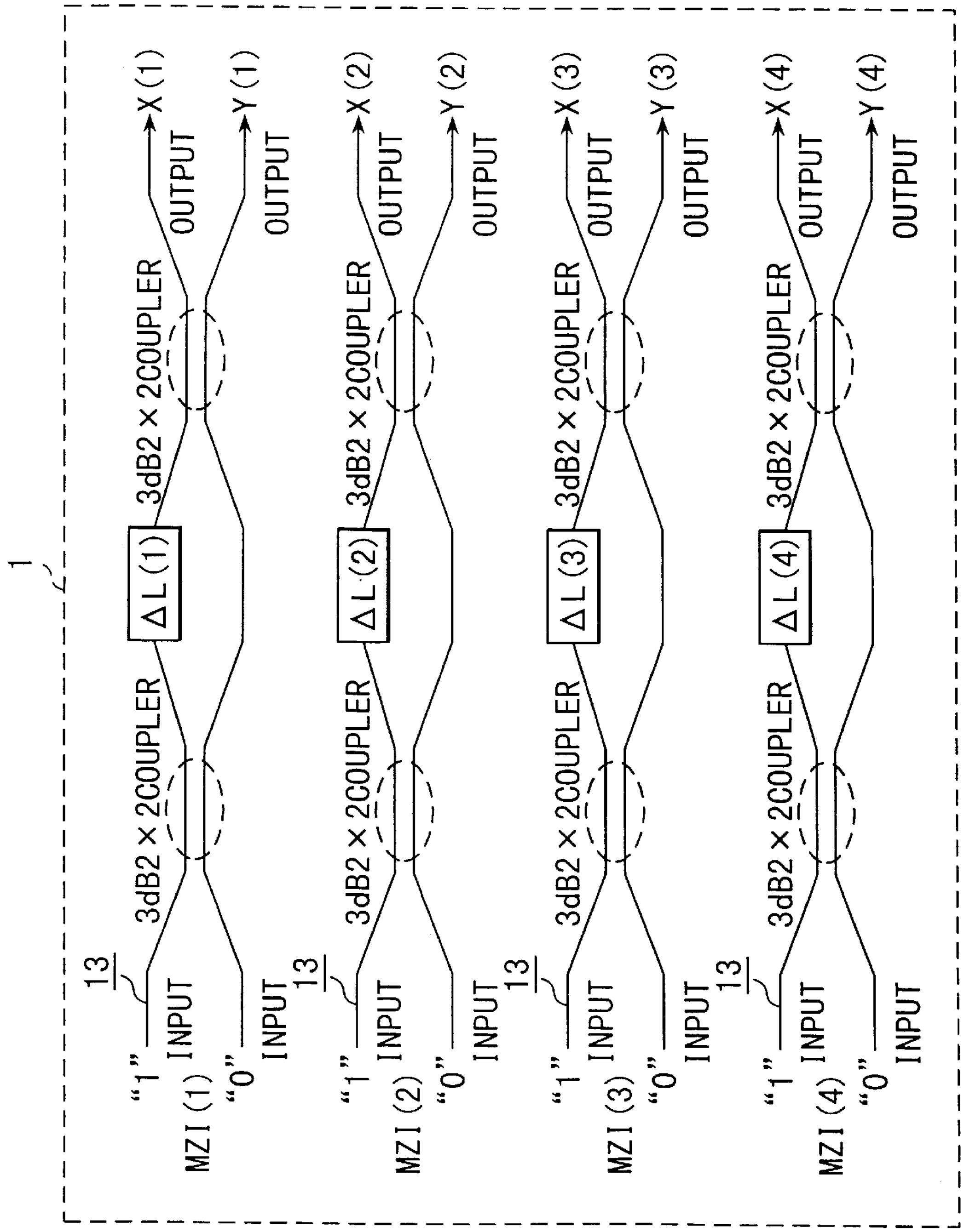
FIG. 3 is a schematic view showing one example of the optical chaotic signal generating device.
Figure 4:
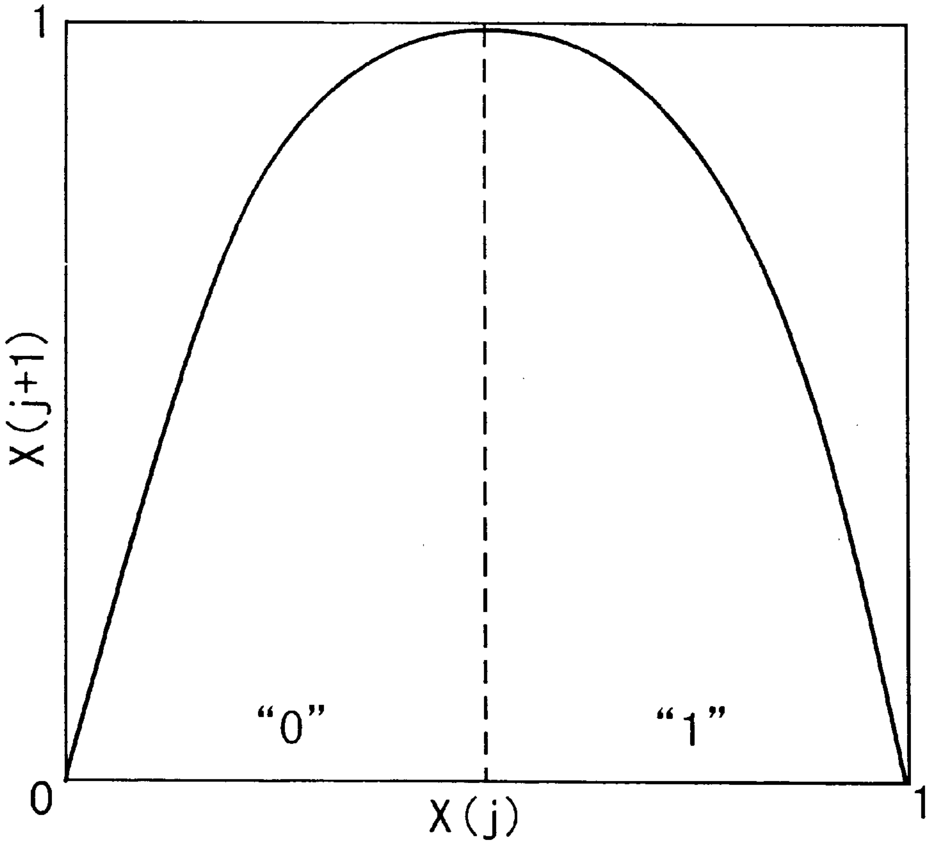
FIG. 4 shows a logistic map that is one example of the Chebyshev map Fm in which m=2.

FIG. 2 is a schematic view showing one example of the optical signal splitting device 3 for inputting the optical source signal into the optical chaotic signal generating device 1 shown in FIG. 3. In this example, light from a light source 11, such as a laser, is splitted into eight optical signals having the same optical power using seven couplers 12 arranged in three stages. The eight optical signals are transmitted respectively to the eight interferometers 13 constituting the optical chaotic signal generating device 1. Eight separate light sources can be connected respectively to the input ports of the eight interferometers 13 via optical fibers by means of connectors.

As the optical interferometers constituting the optical chaotic signal generating device 1 for splitting the input beams and interfering the splitted beams to produce interference effects using the optical path length difference between the optical paths at the portions of splitting and interfering, Mach-Zehnder interferometers can be used. As shown in FIG. 3, the optical chaotic signal generating device 1 is constituted of an optical circuit comprising a plurality of Mach-Zehnder interferometers (MZI) arranged in parallel. In the example of FIG. 3, four interferometers MZI (1) to MZI (4) constitute the optical circuit. In this case, a dynamical variable X(i) indicates optical power and it can be detected by the conventional square detection. The length difference between the pair of optical paths of each interferometer 13 can be made by providing the optical path length difference data memory device 2 with a thermal-optical phase shifter 14 that produces a phase difference between the pair of optical paths, a temperature control section 15 that outputs temperature signals for warming one of the pair of optical paths to enable the shifter 14 to function, and a temperature display section 16 that displays and memorizes the temperature signals from the control section 15.

The optical output signals (optical chaotic signals) from the interferometers 13 of the optical chaotic signal generating device 1 are transmitted to photodetectors 17 constituting the optical output signal measuring device 4 via optical fibers and converted into electrical signals with power corresponding to the optical power of the optical output signals, and the optical powers are measured as the electrical signals. Therefore, the measured values are nonnegative and the measured electrical signals emerge in the vector form of a predetermined number of dimensionally corresponding to the number of the interferometers.

Electrical output signals from the optical output signal measuring device 4 are transmitted to an input unit 18 of the optical output signal memory device 5. The input unit 18 inputs the received electrical signals to a CPU 19 that causes the electrical signal values to be memorized as the optical signal power values in an external memory unit 22 and to be displayed as occasion demands in a display unit 23. Since the optical output signal memory device 5 shown in FIG. 1 includes the CPU 19, a ROM 20 and main memory unit 21, it can perform general signal processing. The vector of the predetermined number of dimensionally with nonnegative real elements memorized constitute chaotic sequences X(1), X(2), X(3), . . . , X(N) arranged in parallel. Therefore, the optical chaotic signals obtained by the optical chaotic random number generating apparatus can be used as seed signals for generating new chaotic random numbers.

The optical chaotic signal generating device 1 comprising a plurality of optical interferometers can be integrated and fabricated using the planar lightwave circuit technology that forms optical waveguides on a silicon substrate.

In FIG. 3, the plurality of Mach-Zehnder interferometers are given from above reference symbols MZI(1), MZI(2), . . . MZI(N). Each Mach-Zehnder interferometer MZI(j) has a pair of input ports and a pair of output ports. When the optical path length difference in the MZI(j) is expressed as ΔL(j), provided that 1≦j≦N, the effective refractive index as n, and the input light wavelength as λ, the scattering matrix of the MZI(j) is determined from Equation 4 below (Paul E. Green, "Fiber Optic Networks" (Prentice Hall 1993), p. 124), in which Ha(λ) denotes a complex amplitude of an electromagnetic field at the output port k when there is a unit amplitude of the electromagnetic field input only at input port i. The symbol i and k of Ha(λ) denotes 1 (upper port) or 2 (lower port).

$$\begin{pmatrix} H_{11}(\lambda) & H_{12}(\lambda) \\ H_{12}(\lambda) & H_{21}(\lambda) \end{pmatrix} = \frac{1}{2j}\begin{pmatrix} j\exp\left(-j2\pi\Delta L(j)\frac{n}{\lambda}\right)-1 & \exp\left(-j2\pi\frac{\Delta L(j)}{\lambda}n\right)+1 \\ \exp\left(-j2\pi\frac{\Delta L(j)}{\lambda}n\right)+1 & j\exp\left(-j2\pi\frac{\Delta L(j)}{\lambda}n\right)+1 \end{pmatrix} \qquad [4]$$

When one of the pair of input ports (the lower input port in FIG. 3) of the MZI(j) receives no input signal, a complex electromagnetic field vector received at the output ports is determined from Equation 5 below.

$$\begin{pmatrix} H_{11}(\lambda) \\ H_{21}(\lambda) \end{pmatrix} = \frac{1}{2j}\begin{pmatrix} j\exp\left(-j2\pi\Delta L(j)\frac{n}{\lambda}\right)-1 \\ \exp\left(-j2\pi\Delta L(j)\frac{n}{\lambda}\right)+1 \end{pmatrix} \qquad [5]$$

Therefore, the optical powers received at the output ports are given by a nonnegative trigonometric function as shown in Equation 6 below.

$$\begin{pmatrix}|H_{11}(\lambda)|^2\\|H_{21}(\lambda)|^2\end{pmatrix}=\begin{pmatrix}\sin^2\left(\pi\Delta L(j)\frac{n}{\lambda}\right)\\\cos^2\left(\pi\frac{\Delta L(j)}{\lambda}n\right)\end{pmatrix}\tag{6}$$

The optical path length difference ΔL(j+1) of the (j+1)th Mach-Zehnder interferometer MZI(j+1) is set to be m-fold the difference ΔL(j) of the (j)th Mach-Zehnder interferometer as given by Equation 3 below, provided that the conditions of the wavelength λ and the effective refractive index n are in common with each other and m is in an integer not less than 2.

$$\Delta L(j+1)=m\Delta L(j)\tag{3}$$

The optical powers received by the interferometer MZI(j) are given by the same nonnegative trigonometric function as shown by Equation 7 below.

$$\begin{pmatrix}|H_{11}(\lambda)|^2\\|H_{21}(\lambda)|^2\end{pmatrix}=\begin{pmatrix}\sin^2\left(\pi m^{j-1}\Delta\frac{L(1)\cdot n}{\lambda}\right)\\\cos^2\left(\pi m^{j-1}\Delta\frac{L(1)\cdot n}{\lambda}\right)\end{pmatrix}\tag{7}$$

The optical power at the upper output port of each interferometer MZI(j) is read to be the dynamical variable X(j) as shown by Equation 8 below.

$$X(j)=\sin^2\left(\pi m^{j-1}\Delta\frac{L(1)\cdot n}{\lambda}\right)\tag{8}$$

When m=2, the optical output powers X(j+1) and X(j) form a logistic map the same as Equation 1 in accordance with the duplication formula of the sine function, i.e. as sin(2a)=2cos(a)sin(a). When m=3, the two powers form a cubic map the same as Equation 2 in accordance with the triplication formula of the sine function. Similarly, when m is a given integer (not less than 2) the two powers form a chaotic map called a Chebyshev map (m-th order polynominal) in accordance with the m-fold multiplication formula of the sine function (R. L. Adler and T. J. Rivlin, Proc. Am. Math. Soc. 15 (1964) 794).

If the optical output powers Y(j) at the lower output port are used, the optical output powers Y(j+1) and Y(j) form a relation described by the m-fold multiplication formula of $\cos^2(*)$ function. The corresponding relation is given by a rational change of variable of a Chebyshev map.

All these maps are maps from a unit interval (0, 1) to a unit interval (0, 1) and have the pronounced property that the spacial average equals the temporal average, which means their ergodicity. In this case, the spatial average is given by the invariant measure (Equation 9 below) all these maps have in common.

$$p(x)dx=\frac{dx}{\pi\sqrt{x(1-x)}}\tag{9}$$

Therefore, when N number of Mach-Zehnder interferometers satisfying the aforementioned properties are prepared, it is possible to obtain, as optical power values measured on the respective output sides, outputs the same as the values calculated in these chaotic dynamical systems. When the initial conditions are given to the chaotic dynamical systems, the systems have both the deterministic feature that is determined by a mapping (chaos map) and the ergodicity that is required for the ideal random number characteristic, and can be used as random number generators with the ergodicity generally guaranteed. As a result, Monte Carlo computations based on the ergodicity (Equation 10) can be performed using the Monte Carlo algorithm based an such chaotic random numbers (JP-P-A-HEI-10-283344).

$$\lim_{N\to\infty}\frac{1}{N}\sum_{i=1}^{N}A[x(i)]=\int_0^1 A(x)P(x)dx\tag{10}$$

In Equation 10, A(x) is a function falling in Class L1(P) of integrable functions of [0, 1] of Equation 10.

When coding transformation is made by setting a threshold value to be 0.5 and using the rule that values not less than the threshold value are regarded as symbol “1” and values smaller than the threshold value are regarded as symbol “0,” it is possible to obtain binary sequences of independent and identical distribution wherein the symbols “0” and “1” each have probability of 0.5 like an ideal coin-tossing game. When a plurality of threshold values are prepared, ordinary multi-value sequenced can be obtained (e.g. tertiary sequences in the case of the cubic map shown in FIG. 3).

Since real orbits corresponding to any binary sequence symbol exists in the case of the threshold value of 0.5, the apparatus of the present invention can be used advantageously as a binary sequence random number generating apparatus. Since the idea of symbolic dynamics that observes a dynamical system from the corresponding coded sequences is applied, ideal digital random number sequences can be taken out from the optical chaotic signal generating device of the present invention having analogue values.

When the wavelength of light from a light source is varied, the initial conditions of chaotic random numbers to be obtained can be changed. According to the techniques established to date, since the output characteristics of a Mach-Zehnder interferometer, such as a low-loss characteristic, do not depend on the wavelength, an energy loss ratio can be maintained to nearly zero with high precision, resulting in a highly stable interferometer. In the chaotic dynamical systems, a slight change in the initial value produces great output errors relative to the number of repetition of maps in a manner of an exponential function. The chaotic features in the chaotic dynamical system used in the apparatus of the present invention come from the sensitive dependence with the wavelength of the light from the light source. This can strengthen the secure property of the random numbers which can be used in cryptocommunication etc.

The aforementioned Mach-Zehnder interferometer splits incident light, interferes the splitted beams, and produces the effect of light interference based on the difference in length of two optical paths at the portions between the light splitting and the beam interfering.

When the two optical paths of each interferometer have a length difference of ΔL(j), the scattering matrix of each interferometer is given by Equation 4. Therefore, when the optical power input to the upper input port of each Mach-Zehnder interferometer in FIG. 3 is 1 and the optical power input to the lower output port theretofore is 0, the optical output power X(j) output from the upper output port of each interferometer is given by Equation 8. Since the optical path length difference ΔL(j) satisfies a linear relational expression given by Equation 3 wherein m is an integer not less than 2, a relational expression between an optical output X(j+1) of the (j+1)th Mach-Zehnder interferometer MZI(j+1) and an optical output X(j) of the (j)th Mach-Zehnder interferometer MZI(j) becomes equal to the m-fold multiplication formula of $\sin^2(x)$. That is to say, the output of each Mach-Zehnder interferometer, when m=2, satisfies the logistic map (Equation 1) given by the duplication formula of $\sin^2(x)$ and, when m=3, satisfies the cubic map (Equation 2) given by the triplication formula of $\sin^2(x)$. When m is any other integer, the output satisfies an m-th order Chebyshev map Fm equal to the m-fold multiplication formula of $\sin^2(x)$ that gives the following relational expression (Equation 11).

$$X(j+1)=Fm(X(j)) \tag{11}$$

Since this relational expression is included in map dynamic systems giving the aforesaid solvable chaos, it is found that solvable chaos can be realized by an optical numbers, using the high-speed property of light, that are used in a wide range of application fields including the Monte Carlo method, spread spectrum communication system, optical communication system and cipher key production.

Working Examples of the present invention will now be described.

WORKING EXAMPLE 1

A wavelength tunable laser was used as the light source. The initial value X(1) was set to be a real value variable from 0 to 1. The effective refractive index was expressed as n, and the optical path length difference ΔL(1) of the Mach-Zehnder interferometer MZI(1) was expressed as ΔL. From Equation 8, the result was $X(1)=\sin^2((\pi n\Delta L/\lambda))$. Since the length of the light from the light source was set variable so that $\lambda_s \leqq \lambda \leqq \lambda_l$ could be satisfied in order for the initial value X(1) to always take a value from 0 to 1 at least one time, Equation 12 had to be conditioned.

$$\frac{n\Delta L}{\lambda l}=a,\ \frac{n\Delta L}{\lambda s}=a+1 \tag{12}$$

From Equation 12, therefore, the optical path length difference of the interferometer MZI(1) could be determined by the upper limit $\lambda_s$ and the lower limit $\lambda_l$ of the wavelength as shown by Equation 13 below.

$$\Delta L=\lambda_l\lambda_s/n(\lambda_l-\lambda_s) \tag{13}$$

That is to say, it was preferable that the optical path length difference of the first Mach-Zehnder interferometer MZI(1) be a value determined by Equation 13 or the determined value multiplied by an integer. The value ΔL was estimated citing the following actual case. In the case of the wavelength tunable laser light source produced by Hewlett Packard K. K. Japan (Product No. HP8168F) having a wavelength range of 1450 nm to 1590 nm, i.e. $\lambda_s$=1450 nm and $\lambda_l$=1590 nm, ΔL could be estimated as 16467.8/n (nm). In this case, it was found that the optical path length difference ΔL of the Mach-Zehnder interferometer MZI(1) was preferably 16./5n (μm) multiplied by an integer.

Thus, even when another wavelength tunable light source is adopted, the optical path length difference ΔL(1) of a Mach-Zehnder interferometer MZI(1) can be estimated using Equation 13 in the same manner as in the actual case shown above. The optical path length difference ΔL(j) of each Mach-Zehnder interferometer MZI(j) can also be estimated in accordance with Equation 13.

WORKING EXAMPLE 2

A logistic map (Equation 1) was realized using an optical circuit in which the relational expression (Equation 3) of the optical path length difference of each of N number of Mach-Zehnder interferometers was designed so that m=2, a light source was splitted to each upper input port of the interferometers, and the energy power X(j) of the light output from the upper output port of the j-th interferometer MZI(j) satisfied Equation 14 below, resulting in that the output light energy power X(j) obtained with each interferometer shown in FIG. 3 satisfied the logistic map (Equation 1) in view of the duplication formula of a sine function. Thus, the logistic map dynamic system was realized using the optical circuit provided with the Mach-Zehnder interferometers.

$$X(j)=\sin^2(2^{j-1}\Delta L(1)n/\lambda) \tag{14}$$

Since it is known that the logistic map dynamical system is characterized by chaos, the optical circuit used herein is a chaotic random number generating apparatus. In this case, each of the Kolmogorov-Sinai entropy and the Lyapunov exponent showing the degree of chaos is log 2, provided that log stands for a natural logarithm, and the apparatus can be regarded as a random number generator that produces 1-bit data per Mach-Zehnder interferometer. When the output values X(j) thus obtained are divided into two symbols "0" in the case of not executing 0.5 and "1" in the case of not less than 0.5,each probability of the symbols "0" and "1" is ½ and, therefore, the generator is a physically operating random binary sequence generator having the same features as an ideal coin-tossing game.

WORKING EXAMPLE 3

A cubic map (Equation 2) was realized using an optical circuit in which the relational expression (Equation 3) of the optical path length difference of each of N number of Mach-Zehnder interferometers was designed so that m=3, a light source was splitted to each upper input port of the interferometers in the same manner as in Working Example 2, and the energy powers X(j) of the light output from the upper output port of the j-th interferometer MZI(j) satisfied Equation 15 below, resulting in that the output light energy powers X(j) obtained with each interferometer shown in FIG. 3 satisfied the cubic map (Equation 2) in view of the triplication formula of a sine function. Thus, the cubic map dynamical system was realized using the optical circuit provided with the Mach-Zehnder interferometers.

$$X(j)=\sin^2(3^{j-1}\Delta L(1)n/\lambda) \tag{15}$$

Figure 5:
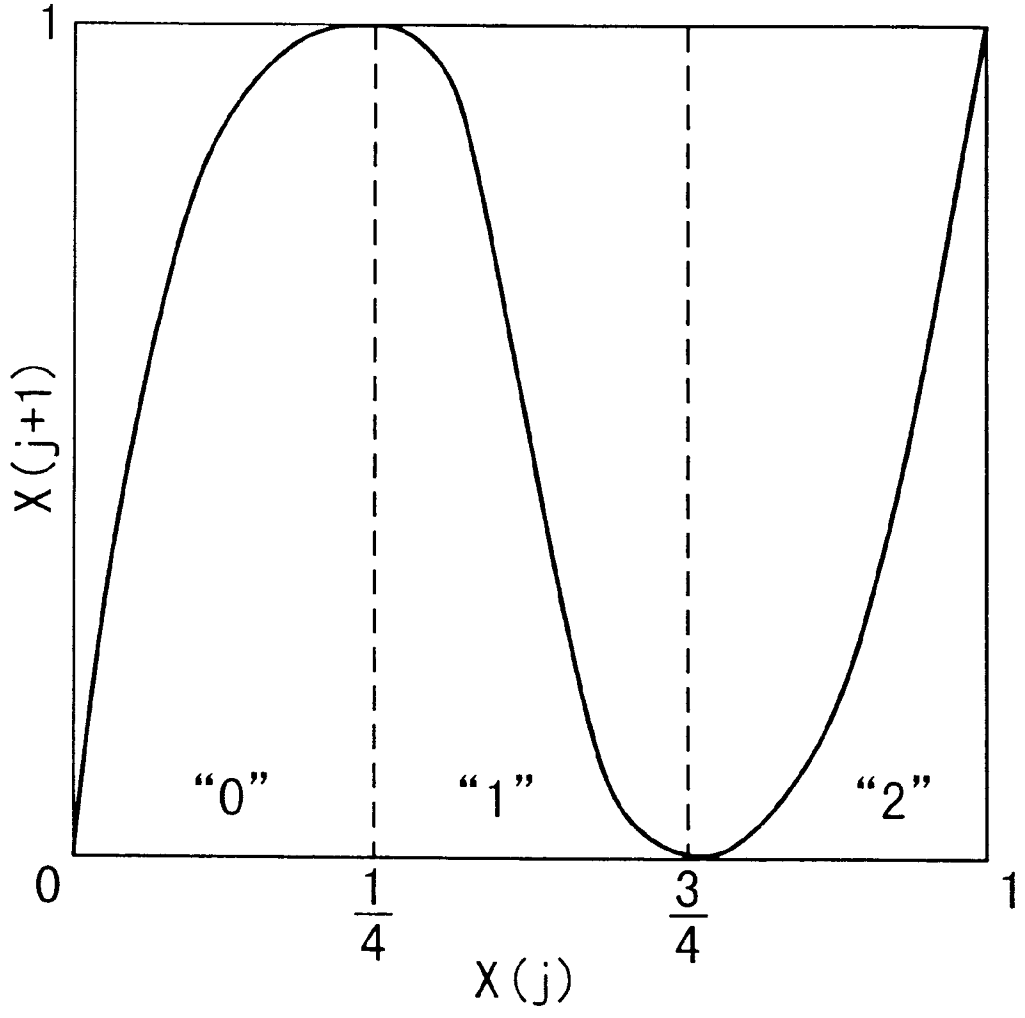
FIG. 5 show a cubic map that is one example of the Chebyshev map Fm in which m=3.

Since it is known that the cubic map dynamical system is characterized by chaos, the optical circuit used herein is a chaotic random number generating apparatus. In this case, the Lyapunov exponent and Kolmogorov-Sinai entropy showing the degree of chaos is log 3, and the apparatus can be regarded as a random number generator that produces $\log_2 3$-bit data per Mach-Zehnder interferometer (i.e. per step of the chaotic dynamical system). When the output values X(j) thus obtained are divided into three symbols "0" in the case of less than 0.25, "1" in the case of not less than 025 and smaller than 0.75, and "2" in the case of not less than 0.75, each probability of the symbols "0," "1" and "2" is ⅓ and, therefore, the generator is a random tertiary sequence generator having a length of N (as shown in FIG. 5).

WORKING EXAMPLE 4

While the optical output signal powers X(j) were taken out from the upper output ports of the Mach-Zehnder interferometers in Working Examples 1 to 3, optical output signal powers Y(j) were taken out from the lower output ports of the Mach-Zehnder interferometers in this Working Example. Since the optical path length difference ΔL(j) of Mach-Zehnder interferometer satisfied the conditions (Equation 3), the relational expression between the optical output signal power Y(j+1) and Y(j) satisfied Y(j+1)=Gm (Y(j)) that is the m-fold multiplication formula of $\cos^2(x)$.

The aforementioned function Gm(*) is a chaos map that is expressed as an m-th order polynomial satisfying the aforementioned Chebyshev map Fm(*) and the relation expression (Equation 16 below). By adjusting the relationship between the input and output ports actually used, the shape of chaos maps can be varied, but the shapes of these chaos maps are limited to the shapes of functions given by the m-fold multiplication formulae of a trigonometric function.

$$Y(j+1)=Gm[Y(j)]=1-F(1-Y(j)) \quad (16)$$

The present invention is not limited to the aforementioned Working Examples, but can be modified variously within the scope not departing from the gist of the present invention.

By the use of the characteristics of the optical circuit of the present invention, random numbers can be generated at a speed exceeding the operation restriction of a conventional electronic device of theoretically about 750 GHz and practically about 600 MHz. Furthermore, the present invention makes it possible to provide an integrated and miniaturized apparatus that have not been realized with conventional optical laser chaotic systems, using the planar lightwave circuit fabricating technology. Moreover, since the random numbers in the present invention are those using chaos having the sensitive dependence with the initial value, they have a higher secure property than the random numbers produced by a conventional shift register including the M sequences and are suitable for use in fast generation of a cipher key and in secret communication requiring privacy maintenance.

What is claimed is:

1. An apparatus for optically generating chaotic random numbers to obtain chaotic random numbers satisfying a chaotic dynamical system expressed by X(n+1)=F(X(n)), comprising:

an optical signal splitting means for splitting light from a light source into a predetermined number of beams with identical optical power;

optical chaotic signal generating means comprising a same number of interferometers as the beams, each having a pair of optical paths for receiving the beams from the optical signal splitting means, splitting each of the beams, interfering the splitted beams and outputting optical chaotic signals;

optical path length difference data memory means for memorizing data on a difference between lengths of the pair of optical paths at portions thereof between splitting and interfering;

optical output signal measuring means for measuring optical power of the optical chaotic signals output from the interferometers as chaotic random numbers; and optical output signal memory means for memorizing measured optical power values of the optical chaotic signals expressed by a vector of a same number of dimensionally as the interferometers, with nonnegative real elements.

2. The apparatus according to claim 1, wherein said interferometers are Mach-Zehnder interferometers, and an optical path length difference Δ(j) of a j-th Mach-Zehnder interferometer satisfies a predetermined relation, whereby optical power X(j) satisfies a dynamical system X(j+1)=F (X(j)) produced by a map F(*) obtained from an addition formula of a trigonometric function, provided that j is a natural number which is less than or equal to the number of the interferometers.

3. The apparatuses according to claim 1, wherein said interferometers are Mach-Zehnder interferometers, and an optical path length difference Δ(j) of a j-th Mach-Zehnder interferometer satisfies a predetermined relation, whereby optical power X(j) satisfies dynamical systems including at least a logistic map (Equation 1) and a cubic map (Equation 2) and a dynamical system X(j+1)=F(X(j)) produced from an m-th order Chebyshev map Fm(*) wherein m is an integer of 2 or more or from a map F(*) obtained by a rational change of a variable of the Chebyshev map.

$$X(j+1)=4X(j)(1-X(j)) \quad \text{(Equation 1)}$$

$$X(j+1)=X(j)(3-4X(j)) \quad \text{(Equation 2).}$$

4. The apparatus according to claim 1, further comprising a signal modulation means for modulating the optical power values expressed by a vector of a same number of dimensionality as the interferometers.

5. The apparats according to claim 1, wherein said interferometers are Mach-Zehnder interferometers, and an optical path length difference ΔL(j+1) of said optical path length difference data memory means of a (j+1)th Mach-Zehnder interferometer equals m-fold an optical path length difference ΔL(j) of said optical path length difference data memory means of a j-th Mach-Zehnder interferometer (Equation 3), provided that $m \geqq 2$, and j is a natural number which is less than or equal to the number of the interferometers.

$$\Delta L(j+1)=m\Delta L(j) \quad \text{(Equation 3).}$$

* * * * *

UNITED STATES PATENT AND TRADEMARK OFFICE
CERTIFICATE OF CORRECTION

PATENT NO. : 6,263,146 B1
DATED : July 17, 2001
INVENTOR(S) : Umeno et al.

It is certified that error appears in the above-identified patent and that said Letters Patent is hereby corrected as shown below:

Title page,
Item [73], the Assignee information should read:
-- [73] Assignee: Communications Research Laboratory, Ministry of Posts and Telecommunications, Koganei-shi (JP); a part interest --

Signed and Sealed this

Twenty-ninth Day of October, 2002

*Attest:*

JAMES E. ROGAN

*Attesting Officer*

*Director of the United States Patent and Trademark Office*